US009672253B1

(12) United States Patent
Seo (10) Patent No.: US 9,672,253 B1
(45) Date of Patent: *Jun. 6, 2017

(54) RANKING A SEARCH RESULT DOCUMENT BASED ON DATA USAGE TO LOAD THE SEARCH RESULT DOCUMENT

(71) Applicant: Google Inc., Mountain View, CA (US)

(72) Inventor: Minkoo Seo, KyungGiDo (KR)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,292

(22) Filed: Nov. 2, 2015

Related U.S. Application Data

(63) Continuation of application No. 13/963,427, filed on Aug. 9, 2013, now Pat. No. 9,201,929.

(51) Int. Cl.
G06F 17/30 (2006.01)

(52) U.S. Cl.
CPC .... *G06F 17/3053* (2013.01); *G06F 17/30011* (2013.01); *G06F 17/30528* (2013.01); *G06F 17/30554* (2013.01)

(58) Field of Classification Search
None
See application file for complete search history.

(56) References Cited

U.S. PATENT DOCUMENTS

| 7,562,068 | B2 | 7/2009 | Naam | |
|---|---|---|---|---|
| 7,987,185 | B1 * | 7/2011 | Mysen | G06F 17/30864 707/733 |
| 8,095,536 | B1 * | 1/2012 | Kelly | G06F 17/30528 705/5 |
| 8,195,637 | B1 | 6/2012 | Datar et al. | |
| 8,291,312 | B1 * | 10/2012 | Zhou | G06F 17/30902 709/203 |
| 8,645,362 | B1 | 2/2014 | Jain et al. | |
| 2002/0032682 | A1 * | 3/2002 | Kobayashi | G06F 17/3069 |
| 2005/0289102 | A1 | 12/2005 | Das et al. | |
| 2006/0242129 | A1 | 10/2006 | Libes et al. | |
| 2007/0067284 | A1 * | 3/2007 | Meyerzon | G06F 17/3053 |
| 2007/0088690 | A1 * | 4/2007 | Wiggen | G06F 17/30106 |

(Continued)

FOREIGN PATENT DOCUMENTS

| JP | 2010186214 | 8/2010 |
|---|---|---|
| WO | 2012142751 | 10/2012 |

OTHER PUBLICATIONS

Han, Network Agile Preference-Based Prefetching for Mobile Devices, Department of Computer Science, Illinois Institute of Technology, and TNLIST, Ysinghua University, Email: jhan20@iit.edu, xli@cs.iit.edu Jul. 31, 2012.

*Primary Examiner* — Hung Le
(74) *Attorney, Agent, or Firm* — Middleton Reutlinger (57) ABSTRACT

Methods and apparatus for ranking one or more documents that are responsive to a search query. A document that is responsive to the search query may be ranked based on a data measure of the document that is indicative of an amount of data usage required to load the document. In some implementations, the data measure of the document may be a measured value based on actual data usage during retrieval of the document. In some implementations, the ranking of two or more documents may be based on comparison of the data measures of the two or more documents.

18 Claims, 6 Drawing Sheets

(56) References Cited

U.S. PATENT DOCUMENTS

| | | |
|---|---|---|
| 2008/0091655 A1 | 4/2008 | Gokhale et al. |
| 2008/0114750 A1 | 5/2008 | Saxena et al. |
| 2008/0114751 A1* | 5/2008 | Cramer ............ G06F 17/30554 |
| 2008/0287096 A1 | 11/2008 | Aaltonen et al. |
| 2009/0076927 A1 | 3/2009 | Sridhar et al. |
| 2009/0119261 A1* | 5/2009 | Ismalon .............. G06F 17/3064 |
| 2010/0332401 A1 | 12/2010 | Prahlad et al. |
| 2011/0258080 A1 | 10/2011 | Lunenfeld |
| 2012/0185472 A1* | 7/2012 | Ahmed ............ G06F 17/30867 |
| | | 707/728 |
| 2013/0035059 A1 | 2/2013 | Liu et al. |
| 2013/0212095 A1* | 8/2013 | Barad ............... G06F 17/30864 |
| | | 707/730 |
| 2014/0214787 A1 | 7/2014 | Lorge et al. |
| 2014/0258277 A1 | 9/2014 | Cheng et al. |
| 2015/0032717 A1* | 1/2015 | Cramer ............ G06F 17/30867 |
| | | 707/709 |

\* cited by examiner

| Rankings not taking into account data usage | | | | |
|---|---|---|---|---|
| Document | Score | Ranking | Contents | Data Usage (kB) |
| D1 | 0.65 | 1 | A | 100 |
| D2 | 0.6 | 2 | A' | 80 |
| D3 | 0.3 | 3 | B | 70 |
| D4 | 0.1 | 4 | C | 50 |
| D5 | 0.09 | 5 | D | 200 |
| D6 | 0.07 | 6 | E | 150 |
| D7 | 0.06 | 7 | A'' | 200 |
| D8 | 0.05 | 8 | F | 100 |
| D9 | 0.04 | 9 | G | 50 |
| D10 | 0.01 | 10 | H | 70 |

FIG. 5A

| Rankings taking into account data usage | | | | |
|---|---|---|---|---|
| Document | Score | Ranking | Contents | Data Usage (kB) |
| D1 | 0.065 | 2 | A | 100 |
| D2 | 0.06708 | 1 | A' | 80 |
| D3 | 0.03586 | 3 | B | 70 |
| D4 | 0.01414 | 4 | C | 50 |
| D5 | 0.00636 | 5 | D | 200 |
| D6 | 0.00572 | 6 | E | 150 |
| D7 | 0.00424 | 9 | A'' | 200 |
| D8 | 0.005 | 8 | F | 100 |
| D9 | 0.00566 | 7 | G | 50 |
| D10 | 0.00120 | 10 | H | 70 |

FIG. 5B

| Rankings not taking into account data usage | | | |
|---|---|---|---|
| Document | Ranking | Contents | Data Usage (kB) |
| D1 | 1 | A | 100 |
| D2 | 2 | A' | 80 |
| D3 | 3 | B | 70 |
| D4 | 4 | C | 50 |
| D5 | 5 | D | 200 |
| D6 | 6 | E | 150 |
| D7 | 7 | A'' | 200 |
| D8 | 8 | F | 100 |
| D9 | 9 | G | 50 |
| D10 | 10 | H | 70 |

FIG. 6A

| Rankings taking into account data usage | | | |
|---|---|---|---|
| Document | Ranking | Contents | Data Usage (kB) |
| D1 | 2 | A | 100 |
| D2 | 1 | A' | 80 |
| D3 | 3 | B | 70 |
| D4 | 4 | C | 50 |
| D5 | 5 | D | 200 |
| D6 | 6 | E | 150 |
| D7 | 7 | A'' | 200 |
| D8 | 8 | F | 100 |
| D9 | 9 | G | 50 |
| D10 | 10 | H | 70 |

RANKING A SEARCH RESULT DOCUMENT BASED ON DATA USAGE TO LOAD THE SEARCH RESULT DOCUMENT

BACKGROUND

Internet search engines provide information about Internet accessible documents such as web pages, images, text documents, and/or multimedia content. A search engine may identify the documents in response to a user's search query that includes one or more search terms. The search engine ranks the documents based on the relevance of the documents to the query and the importance of the documents and provides search results that include aspects of and/or a link to the identified documents.

SUMMARY

This specification is directed generally to ranking search result documents, and, more particularly, to ranking a search result document based on data usage required to load the search result document. For example, a document that is responsive to a search query may be ranked based on a data measure of the document that is indicative of an amount of data usage required to load the document. In some implementations, the data measure of the document may be a measured value based on actual data usage during retrieval of the document. For example, the document may be a webpage that includes HTML code, and the measured value may be based on actual data usage in retrieving such HTML code and in retrieving one or more aspects of content that is mapped in such HTML code and that would be retrieved by a browser or other application in retrieving the webpage and rendering the webpage for display to a user. Content that may be mapped in the HTML code may include, for example, images, sounds, additional code (e.g., ECMAScript implementations such as JavaScript), and/or other content. In some implementations, the ranking of two or more documents may be based on comparison of the data measures of the two or more documents. For example, for a first document and a second document that include similar content, the ranking of the first document and/or the second document may be based on comparison of a data measure of the first document and a data measure of the second document. For example, if the data measure of the first document is indicative of less data usage than the data measure of the second document, the ranking of the first document may be positively impacted and/or the ranking of the second document may be negatively impacted. In some implementations the ranking of a document may be based on determining an initial ranking of the document and modifying the initial ranking based on a data measure of the document. For example, the initial ranking of the document may be more positively influenced if a first data measure is associated with the document that is indicative of a first amount of data usage than it would be if a second data measure is associated with the document that is indicative of a second amount of data usage that is greater than the first amount of data usage.

In some implementations a computer implemented method may be provided that includes the steps of: receiving a search query; identifying a plurality of documents that are responsive to the search query; determining a first data measure for a first document of one or more of the documents, wherein the first data measure of the first document is based on an amount of data usage in a prior retrieval of the first document; and ranking the first document relative to other of the documents based at least in part on the first data measure.

This method and other implementations of technology disclosed herein may each optionally include one or more of the following features.

The method may further include the steps of: determining that a second document is similar to the first document; determining a second data measure for the second document, the second data measure of the second document indicative of an amount of data usage required to load the second document; and ranking the second document relative to other of the documents based at least in part on the second data measure. Ranking the first document relative to the other of the documents may include ranking the first document relative to the second document based on comparison of the first data measure to the second data measure. Ranking the first document relative to the second document based on comparison of the first data measure to the second data measure may include: determining the first data measure is indicative of less data usage than the second data measure; and ranking the first document more prominently than the second document when the first data measure is indicative of less data usage than the second data measure.

The method may further include the step of determining that the search query is non-navigational. The determining the ranking for the first document relative to other of the documents based at least in part on the first data measure may occur only when the search query is determined to be non-navigational.

The step of ranking the first document relative to the other of the documents may include: determining an initial ranking of the first document, the initial ranking being independent of the first data measure; and modifying the initial ranking based on the first data measure. The initial ranking of the first document may be an initial relevance score of the first document. The first data measure may be proportional to the amount of data usage required to load the first document, and modifying the initial ranking based on the first data measure may be based on multiplying the initial relevance score by the reciprocal of the first data measure.

The method may further include the steps of: determining that the search query is non-navigational; and determining the weighting of the first data measure based on the search query being determined to be non-navigational.

The method may further include the steps of: receiving a second search query; determining that the second search query is navigational; and preventing determination of rankings of documents responsive to the second search query that are based on data measures of the documents.

The method may further include the step of providing a search result for display that is based on the first document and the ranking of the first document.

The method may further include the step of determining that the search query is likely issued via a limited data plan. The determining the ranking for the first document relative to other of the documents based at least in part on the data measure may occur only when the search query is determined to be likely issued via a limited data plan.

The method may further include the step of determining a likelihood that the search query is issued via a limited data plan. The weighting of the first data measure in determining the ranking for the first document relative to other of the documents may be based on the likelihood that the search query is issued via a limited data plan.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein determine a ranking of a document identified in response to a query based on a data measure of the document and/or a data measure of one or more additional documents identified in response to the query. Such a ranking represents a new aspect of the document that may be based at least on the data measure associated with the document. The ranking may be utilized by one or more applications, such as a search system, to provide a search result based on the document to users of the applications.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
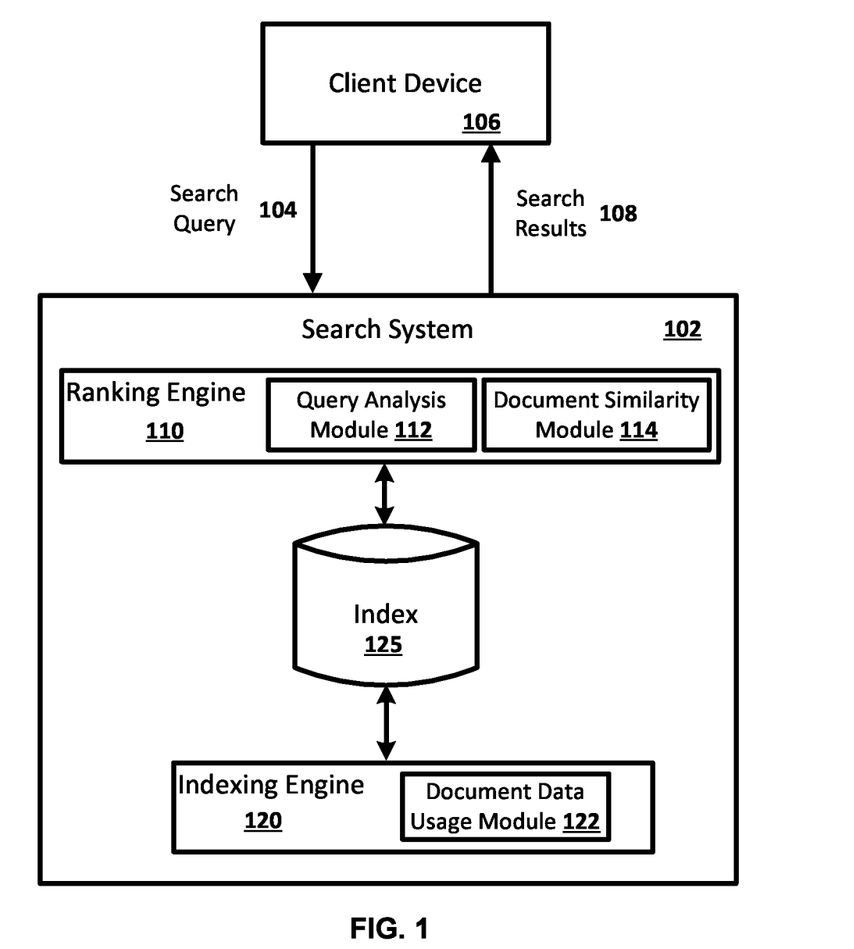
FIG. 1 illustrates an example environment in which a search result may be ranked based on data usage required to load the search result document.

FIG. 1 illustrates an example environment in which a search result may be ranked based on data usage required to load the search result document. The example environment includes client device 106 and a search system 102. The search system 102 can be implemented in one or more computers that communicate, for example, through a network. The search system 102 is an example of an information retrieval system in which the systems, components, and techniques described herein may be implemented and/or with which systems, components, and techniques described herein may interface.

A user may interact with the search system 102 via the client device 106. The search system 102 receives search queries 104 from the client device 106 and returns search results 108 in response to the search queries 104. Each search query 104 is a request for information. The search query 104 can be, for example, in a text form and/or in other forms such as, for example, audio form and/or image form. Other computer devices may submit search queries to the search system 102 such as additional client devices and/or one or more servers implementing a service for a website that has partnered with the provider of the search system 102. For brevity, however, the examples are described in the context of the client device 106.

The client device 106 may be a computer coupled to the search system 102 through a network such as a local area network (LAN) or wide area network (WAN) such as the Internet. The client device 106 may be, for example, a desktop computing device, a laptop computing device, a mobile phone computing device, a tablet computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of queries and the sending and receiving of data over a network. The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102 may be implemented as, for example, computer programs running on one or more computers in one or more locations that are coupled to each other through a network.

The search system 102 includes an indexing engine 120 and a ranking engine 110. The indexing engine 120 maintains an index 125 for use by the search system 102. The indexing engine 120 processes documents and updates index entries in the index 125, for example, using conventional and/or other indexing techniques. For example, the indexing engine 120 may crawl one or more resources such as the World Wide Web and index documents accessed via such crawling. Also, for example, the indexing engine 120 may receive information related to one or documents from one or more resources such as web masters controlling such documents and index the documents based on such information.

A document is any data that is associated with a document address. Documents include web pages, word processing documents, portable document format (PDF) documents, images, videos, and feed sources, to name just a few. Each document may include content such as, for example: text, images, videos, sounds, embedded information (e.g., meta information and/or hyperlinks); and/or embedded instructions (e.g., ECMAScript implementations such as JavaScript). For example, a webpage providing a news story for reading by a user may be retrieved by a browser in a markup language that enables the browser to display multiple types of content to a user as indicated by the markup language. For example, the retrieved markup language may itself include text of the news story and such text may be rendered by the browser in displaying the webpage. Also, for example, the retrieved markup language may include mappings to image content such as an image related to the news story and such an image may be retrieved by the browser based on the mapping and rendered by the browser in displaying the webpage. Also, for example, the retrieved markup language may itself include embedded content such as meta information and/or hyperlinks and such embedded content may be utilized in determining how to render other content on the webpage. Also, for example, the retrieved markup language may include mappings to instructions such as javascript utilized in one or more advertisements of the webpage and such instructions may be retrieved and executed by the browser based on the mapping and the advertisements rendered by the browser in displaying the webpage based on such instructions.

In some implementations, some of the index entries in the index 125 may associate one or more documents with respective data measures indicative of an amount of data usage required to load the respective documents. For example, a given index entry may associate an identifier of a given document with a data measure of the given document that is indicative of an amount of data usage required to load the document. Generally speaking, as used herein, to load a document means to retrieve the data associated with the document that is needed to render the document for presentation to a user. For example, for an HMTL webpage, loading the webpage may include retrieving the data necessary to display the webpage to a user from one or more servers hosting the webpage. The data necessary to display the webpage may include data such as the HTML code and one or more aspects of content that is mapped in such HTML code. Thus, the data usage to load the HTML webpage may be the data usage in retrieving the HTML code and the one or more aspects of content mapped in the HTML code. Additional information may optionally be associated with the document in the given index entry such as keywords, document type, etc. Various forms of a data measure indicative of an amount of data usage required to load the document may be utilized. For example, in some implementations the data measure may be an actual or estimated number of bits required to load the document. For example, the data measure may be provided in bytes, kilobytes (kB), megabytes (MB), and so forth. In some implementations the data measure may be a value indicative of an actual and/or estimated range of bits required to load the document. For example, data measures may be a number between zero and one, with 0.01 indicative of an amount of data usage less than 10 kB, 0.02 indicative of an amount of data usage from 10 kB to 20 kB, and so forth. Additional and/or alternative forms of data measures may be utilized including, for example, those that are not numeric in nature (e.g., "A" indicative of less than 10 kB required).

In this specification, the term "database" and "index" will be used broadly to refer to any collection of data. The data of the database and/or the index does not need to be structured in any particular way and it can be stored on storage devices in one or more geographic locations. Thus, for example, the index 125 may include multiple collections of data, each of which may be organized and accessed differently. For example, a first collection of index entries may be utilized to identify documents responsive to the search query 104 and a second collection of index entries may be utilized to identify additional information related to responsive documents such as, for example, a data measure of a responsive document.

In some implementations a document data usage module 122 of the indexing engine 120 may determine, for each of a plurality of documents, a data measure indicative of an amount of data usage of the document. For example, the data usage module 122 may access the document, determine an amount of data usage required to load at least a portion of the document, and associate an identifier of the document with a data measure indicative of the amount of data usage. In some implementations the data measure, and the association between the data measure and the identification of the document, may be stored in a database such as index 125. In some implementations, the determination of an amount of data usage for a document may occur during processing of the document and indexing of other aspects of the document such as metadata, keywords, etc. For example, the indexing engine 120 may crawl one or more resources such as the World Wide Web and index documents accessed via such crawling. In accessing a document, all or aspects of content the document may be retrieved by the data usage module 122 and a determination made as to an amount of data usage required to load the document based on such retrieved aspects. In some implementations the determination of an amount of data usage for a document may occur independently of indexing of other aspects of the document such as metadata, keywords, etc. In some implementations the document data usage module 122 may be provided as a component that is separate from the indexing engine 120. In some implementations the data usage module 122 may perform aspects of one or more of the steps of FIG. 4, such as one or more of steps 400, 405, 410, and 415.

In some implementations, the data usage module 122 may determine the data measure of a document based on meta information of the document. For example, the meta information of a document may contain information related to the size of the document and the data usage module 122 may utilize such meta information to determine the data measure. In some implementations the data usage module 122 may access information related to one or documents that is received from one or more resources such as web masters controlling such documents and determine an amount of data usage based on such information.

In some implementations the data measure of a document may be a measured value based on actual data usage during retrieval of the document. The data usage module 122 may determine the data usage by measuring an amount of data usage during retrieval of the document. For example, the document may be a webpage that includes HTML code, and the measured value may be based on actual data usage in retrieving such HTML code and in retrieving one or more aspects of content that is mapped in such HTML code and that would be retrieved by a browser or other application in retrieving the webpage and rendering the webpage for display to a user. Content that may be mapped in the HTML code may include, for example, images, sounds, additional code (e.g., ECMAScript implementations such as JavaScript), and/or other content. In some implementations the content of a document that is retrieved and/or utilized by the data usage module 122 to determine an amount of data usage may include all content necessary to initially fully render the document. For example, for a webpage, the content may include the entirety of the source code of the webpage such as HTML and/or XML source code and any images, video, music, and/or other media rendered upon initial retrieval the webpage. In some implementations, the content of a document that is retrieved and/or utilized by the data usage module 122 to determine an amount of data usage may include content necessary to recreate only a portion of the document. For example, the content of a webpage that is retrieved and/or utilized by the data usage module 122 may exclude text, but include other content such as images, sound, video, embedded instructions, advertisements, etc.

In some implementations, the data usage module 122 may determine the data value of a document based only on a most recently accessed version of the document. In other implementations, the data value of a document may be based on multiple versions of the document. For example, a document that includes changing content may be retrieved multiple times and an amount of data usage determined that is based on an average or other measure of data usage in the multiple retrievals of the document. For example, for a webpage that includes one or more dynamic advertisements, the data usage required to load the webpage may vary based on which particular advertisement is being provided. A data value for such a webpage may be determined that optionally reflects an average of multiple retrievals of the document. Also, for example, for a webpage that includes changing content such as the first page of a frequently updated blog, the data usage required to load the webpage may vary depending on the current entries on the first page of the blog. A data value for such a webpage may be determined that optionally reflects an average of multiple retrievals of the document. For example, the data value of a document may be based on an average data usage for the last X retrievals of the document.

In some implementations, the content of a document that is retrieved and/or utilized by the data usage module 122 to determine an amount of data usage may be capped if a threshold amount of data usage is determined. For example, a threshold amount of data usage may be 1 MB and data usage module 122 may retrieve content from a document until 1 MB has been retrieved and then set a data value that is indicative of equal to or greater than 1 MB of data usage required to load the document. Additional and/or alternative thresholds may be utilized.

The ranking engine 110 uses the index 125 to identify documents responsive to the search query 104, for example, using conventional and/or other information retrieval techniques. The ranking engine 110 calculates scores for the documents identified as responsive to the search query 104, for example, using one or more ranking signals. Each ranking signal provides information about the document itself and/or the relationship between the document and the search query 104.

In some implementations, one example ranking signal of a document may be the data measure indicative of the amount of data usage required to load the document. Generally speaking, in implementations in which a data measure is utilized as a ranking signal, the score of a document may be more positively influenced by a first data measure that is indicative of a first amount of data usage than it would be by a second data measure that is indicative of a second amount of data usage that is greater than the first amount of data usage.

In some implementations in which a data measure is utilized as a ranking signal, the data measure may be utilized as a ranking signal for all documents responsive to the search query 104. In some implementations, the data measure may be utilized as a ranking signal for only a subset of the documents responsive to the search query 104, such as the X top ranked documents based on other ranking signals independent of the data measure, only documents determined to be similar to one or more other documents, and/or only documents having a popularity measure (e.g., based on a selection rate or other measure of the document for the query) that is less than a threshold. Only utilizing the data measure as a ranking signal for documents having a popularity measure that is less than a threshold may prevent very popular documents that are responsive to a query from being demoted based on the data measure.

Figure 5A:
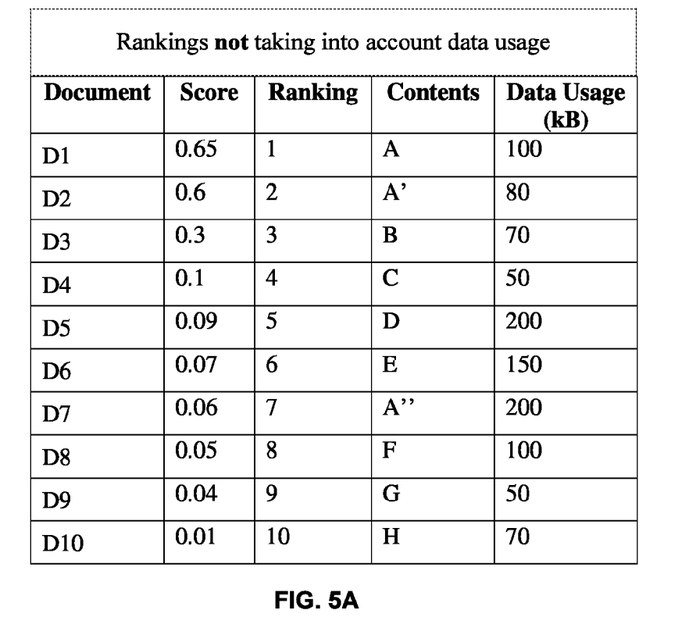
FIG. 5A is an example table utilized in describing an example method of ranking search result documents based on data usage required to load the search result documents.
Figure 5B:
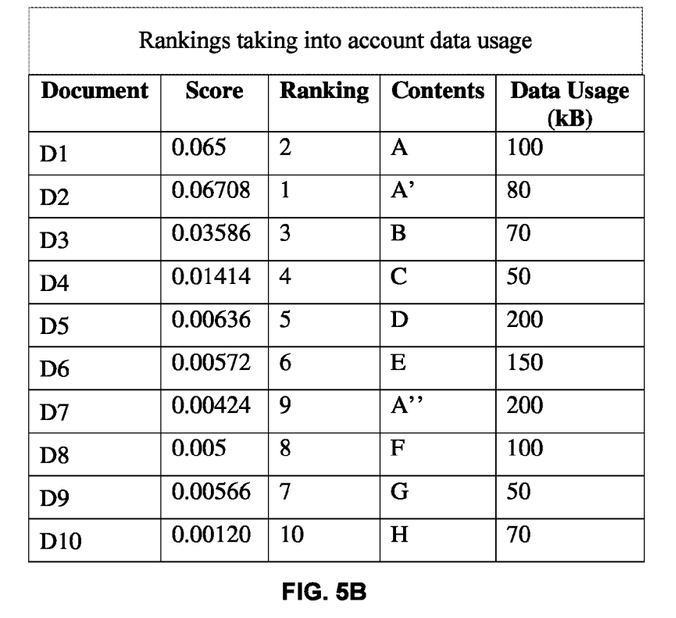
FIG. 5B is another example table utilized in describing the example method of ranking search result documents based on data usage required to load the search result documents.

With reference to FIG. 5A and FIG. 5B, an example method of ranking search result documents based on utilizing a data measure as a ranking signal will be described. FIG. 5A illustrates a table listing documents D1-D10 in the first column and scores associated with each of the documents D1-D10 in the second column. For example, document D1 has a score of 0.65; document D2 has a score of 0.6, and so forth. The scores in FIG. 5A are determined based on ranking signals that are independent of data measures of the documents. A numerical ranking of each of the documents D1-D10 is illustrated in the third column and is based on the score of the second column, with higher scores corresponding to a higher ranking. In alternative implementations lower scores may correspond to a higher ranking. The rankings of FIG. 5A are determined independent of data measures of the documents. An indication of the contents of each of the documents D1-D10 is provided in the fourth column. For example, document D1 has contents A; document D2 has contents A'; document D3 has contents B; and so forth. The contents A of document D1, A' of document D2, and A" of document D7 indicate contents that are similar to one another. For example, documents D1, D2, and D3 may be webpages each hosting the same Associated Press news story, but each containing other content that is unique such as unique hyperlinks, menus, banners, ads, etc. The data usage in kB is illustrated in the fifth column. For example, document D1 has an associated data usage of 100 kB, document D2 has an associated data usage of 80 kB, and so forth. In the example method, the data usage of the fifth column is utilized as the data measure. As discussed herein, in some implementations one or more of the data usages of the fifth column may be a measured value based on actual data usage during retrieval of the document.

FIG. 5B illustrates a table that lists the same documents D1-D10 in the first column as FIG. 5A, lists the same contents in the fourth column as FIG. 5A, and lists the same data usages in the fifth column as FIG. 5A. However, the scores associated with each of the documents D1-D10 in the second column of FIG. 5B have been modified relative to those of FIG. 5A based on the data usages of the fifth column. Also, the rankings associated with the documents D1-D10 in the third column of FIG. 5B have been modified relative to those of FIG. 5A based on the modified scores of the second column. The scores of the second column of FIG. 5B have been modified relative to the scores of FIG. 5A by multiplying, for each of the documents D1-D10, a respective score by the by the inverse of the square root of a respective data usage. This is represented by the following equation:

score of *DX* in FIG. 5*B*=score of *DX* in FIG. 5*A*\*(1/√(Data Usage of *DX*)), wherein DX is representative of the given document for which the scores of FIG. 5B is being determined (D1, D2, . . . D10).

The numerical ranking in FIG. 5B of each of the documents D1-D10 is illustrated in the third column and is based on the score of the second column, with higher scores corresponding to a higher ranking. It is noted that based on the scores of FIG. 5B, the rankings associated with documents D1, D2, D7, and D9 have been altered. In particular, the rankings of documents D2 and D9 have been promoted, whereas the rankings of documents D1 and D7 have been demoted.

Although a particular technique is described with respect to FIGS. 5A and 5B, additional and/or alternative techniques may be utilized to determine a score for a document based on the data measure. For example, in some implementations each data measure may be a value between 0 and 1, with higher values corresponding to less data usage than lower values. In some of those implementations the scores of FIG. 5B may be determined by multiplying the scores of FIG. 5A by the data measures. Also, for example, in some implementations each data measure may be a value between 0 and 1, with lower values corresponding to less data usage than higher values. In some of those implementations the scores of FIG. 5B may be determined by multiplying the scores of FIG. 5A by the inverse of the data measures. Also, for example, in some implementations each data measure may be a value between 1 and 1.2, with higher values corresponding to less data usage than lower values. In some of those implementations the scores of FIG. 5B may be determined by multiplying the scores of FIG. 5A by the data measures only if the data measures are above X value, such as 1.1—thereby applying a boost to certain scores while maintaining certain other scores. Also, for example, in some implementations a score that is independent of the data measure may not be initially determined, but, instead, an initially determined score may take the data measure into account. For example, in some implementations each score may be a value between 0 and 1 and each data measure may be a value between 0 and 0.1, with higher values corresponding to less data usage than lower values. Other ranking signals may likewise be values within a range and may be summed with the data measures.

Additional and/or alternative ranking signals can also be used. For example, additional and/or alternative ranking signals include information about the query itself such as, for example, the terms of the query, an identifier of the user who submitted the query, and/or a categorization of the user who submitted the query (e.g., the geographic location from where the query was submitted, the language of the user who submitted the query, interests of the user who submitted the query, and/or a type of the client device 106 used to submit the query (e.g., mobile device, laptop, desktop)). The identification of the user can be, for example, a user name or the IP address of the client device 106. The geographic location from where the query was submitted can be, for example, a continent, a country, a state, a city, or geographic coordinates, such as latitude and longitude.

Also, for example, additional and/or alternative ranking signals include information about the terms of the query such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Also, for example, additional and/or alternative ranking signals include other information about the document such as, for example, a measure of the quality of the document, a measure of the popularity of the document, the URL of the document, the geographic location where the document is hosted, when the search system 102 first added the document to the index 125, the language of the document, the length of the title of the document, and/or the length of the text of source anchors for links pointing to the document.

The ranking engine 110 then ranks the responsive documents using the scores. For example, the responsive documents are ranked based on the scores. In some implementations one or more of the responsive documents may be initially ranked based on scores that are determined based on ranking signals that are independent of data measures of the documents. The initial ranking of one or more of the responsive documents may then be further modified based on data measures of the one or more responsive documents. For example, a ranking of a responsive document may be promoted relative to other documents based on the data measure of the responsive document and/or based on the data measure of one or more other responsive documents. For example, a ranking of a responsive document may be promoted X positions relative to other documents if the data measure of the responsive document satisfies a threshold and/or if the data measure of the documents over which it is being promoted fails to satisfy a threshold. Also, for example, a ranking of a responsive document may be promoted X positions relative to other documents if the data measure of the responsive document satisfies a threshold and/or if the score of the documents over which it is being promoted fails to satisfy a threshold. Also, for example, a ranking of a responsive document may be demoted relative to other documents based on the data measure of the responsive document and/or based on the data measure of one or more other responsive documents. Additional and/or alternative techniques may be utilized to modify the ranking of one or more of the responsive documents based on the data measure. For example, techniques described herein with respect to FIGS. 6A and 6B may be utilized.

The search system 102 uses the responsive documents ranked by the ranking engine 110 to generate search results 108. The search results 108 include search results corresponding to the documents responsive the search query 104. For example, search results 108 can include titles of each of the documents, links to each of the documents, and/or a summary of content from each of the documents that is responsive to the search query 104. For example, the summary of content may include a particular "snippet" or section of one or more documents that is responsive to the search query 104. Other examples of search results 108 include a summary of information responsive to the search query 104 and/or an answer responsive to the search query 104. The summary can be generated from documents responsive to the search query 104 and/or from other sources. The search results 108 are transmitted to the client device 106 in a form that may be provided to the user. For example, the search results 108 may be transmitted as a search results web page to be displayed on a browser running on the client device and/or as one or more search results conveyed to a user via audio. The search results 108 may be provided to the user based on the ranking of the corresponding search result documents. For example, when the search results are presented as a search results web page, the search results may be displayed based on the ranking of the corresponding search result documents. For example, the most prominently displayed search result may be the highest ranked search result, the next most prominently displayed search result may be the second highest ranked search result, and so forth.

The ranking engine 110 includes a query analysis module 112 and/or a document similarity module 114. In some implementations the query analysis module 112 and/or the document similarity module 114 may be provided as modules separate from the ranking engine 110. In some implementations one or both of the query analysis module 112 and/or the document similarity module 114 may be omitted. In some implementations the query analysis module 112 may perform aspects of one or more of the steps of FIGS. 2 and 3 such as step 200 and step 300. In some implementations the document similarity module 114 may perform aspects of one or more of the steps of FIG. 3 such as step 310.

The query analysis module 112 may determine if a submitted query from client device 106 is a navigational query and/or is a non-navigational query. Generally speaking, a navigational query is a search query that indicates an intention of finding a particular website or a particular webpage. For example, a search query of "youtube" is a navigational query because it indicates an intention of finding the YouTube website. On the other hand, a search query such as "information about green lollipops" is likely not a navigational query because it does not indicate an intention of finding a particular website and/or webpage. In some implementations the ranking of one or more search result documents responsive to a query may be based at least in part on a data measure only when the search query is determined to be non-navigational. In some implementations the degree of impact the data measure has on the ranking of one or more search result documents responsive to a query may be dependent on whether the query is navigational or non-navigational. For example, for a search query that is determined to be navigational, the weighting of data measures of one or more documents in determining a ranking for the one or more documents may be a first weighting that is less than a second weighting of data measures utilized for a search query that is determined to be non-navigational. In some implementations the degree of impact the data measure has on the ranking of one or more search result documents responsive to a search query may be dependent on the degree of confidence that the search query is navigational and/or non-navigational. For example, for a search query that is determined with a high degree of confidence to be navigational, the weighting of data measures of one or more documents in determining a ranking for the one or more documents may be a first weighting that is less than a second weighting of data measures utilized for a search query that is determined with a lesser degree of confidence to be navigational.

In some implementations the query analysis module 112 may determine if a submitted search query from client device 106 is a navigational query and/or is a non-navigational query via a query index and/or other database that contains information related to queries. For example, for a received search query, the query analysis module 112 may reference a query index that contains information related to whether the search query is a navigational query. In some implementations the database may include, for each of one or more search queries, an indication of the degree of confidence that the search query is navigational and/or that the search query is non-navigational. In some implementations the information related to whether the search query is a navigational query may be based on one or more signals such as, for example, a selection rate of one or more of the search result documents that are responsive to the search query. For example, if one or more of the search result documents responsive to the search query has a selection rate that satisfies a threshold, it may be determined to be a navigational query. For example, a search query of "youtube" may have a selection rate for "www.youtube.com" that satisfies a threshold. For example, the threshold may be 30%, 60%, 80%, and/or other determined or selected threshold. Also, for example, if none of the search result documents responsive to the search query have a selection rate that satisfies a threshold, it may be determined to be a non-navigational query. The information related to whether the search query is a navigational query may be based on additional and/or alternative signals such as, the uniform resource locator (URL) of one or more of the responsive documents, the term(s) of the search query, and/or durations of visits to one or more responsive documents after selection of such documents.

In some implementations the query analysis module 112 and/or other component may determine if a submitted search query from client device 106 is a navigational query and/or is a non-navigational query via directly determining if the selection rate of one or more of the search result documents that are responsive to the search query satisfies a threshold and/or if one or more additional and/or alternative signals satisfies a threshold. For example, a ranking signal utilized by ranking engine 110 for a document responsive to a search query may include a ranking signal based on a selection rate of the document for the search query. The ranking signal based on a selection rate of the document for the search query may be utilized to determine if the search query is navigational or non-navigational. For example, if the selection rate of the top search result document for a search query satisfies a threshold, the search query may be determined to be a navigational query.

The query analysis module 112 may additionally and/or alternatively determine if a submitted query from client device 106 is likely issued via a limited data plan. In some implementations the ranking of one or more search result documents responsive to a query may be based at least in part on a data measure only when the search query is determined to be likely issued via a limited data plan. In some implementations the degree of impact the data measure has on the ranking of one or more search result documents responsive to a query may be dependent on whether the query is likely issued via a limited data plan. For example, for a search query that is determined to be likely issued via a limited data plan, the weighting of data measures of one or more documents in determining a ranking for the one or more documents may be a first weighting that is greater than a second weighting of data measures utilized for a search query that is determined to not likely be issued via a limited data plan. In some implementations, the degree of impact the data measure has on the ranking of one or more search result documents responsive to a search query may be dependent on the degree of confidence that the search query is likely issued via a limited data plan.

The query analysis module 112 may utilize one or more techniques in determining if a search query is likely issued via a limited data plan. For example, data submitted with and/or included with a search query such as an IP address of the computing device issuing the query, a MAC address of the computing device, a cookie, and so forth may be utilized to determine if the search query is likely issued via a limited data plan.

The document similarity module 114 may determine if one or more search result documents responsive to a search query contain similar subject matter. In some implementations the ranking of only one or more search result documents responsive to a query that are determined to be similar may be based at least in part on a data measure. For example, in some implementations a ranking of a first document may only be influenced by the data measure of the first document when it is determined that a second document contains similar content as the first document. In some implementations, the degree of impact the data measure has on the ranking of a search result document responsive to a query may be dependent on whether the search result document contains similar content as one or more other search result documents. For example, for a first search result document that is determined to contain similar content as a second search result document, the weighting of the data measure of the first document in determining a ranking for the first document may be a first weighting that is greater than a second weighting of a data measure utilized for a third search result document that does not contain similar content as another search result document. In some implementations, the degree of impact the data measure has on the ranking of a search result document responsive to a search query may be dependent on the degree of similarity between the search result document and one or more other search result documents. For example, for a first search result document that is determined to have a first degree of similarity with a second search result document, the weighting of a data measure of the first search result document in determining a ranking for the first search result document may be a first weighting that is greater than a second weighting of the data measure if the degree of similarity was a second degree of similarity less indicative of similarity that the first degree of similarity.

In some implementations, the document similarity module 114 may determine whether two or more documents contain similar content based on determining a similarity between all content of each of the documents. In some implementations the document similarity module 114 may determine whether two or more documents contain similar content based on determining a similarity between a subset of content of each of the documents. The subset of content of a document may include, for example, meta information of the document; a segment of the document such as indexed content of the document, the first 100 Kilobytes of the content, a randomly selected percentage of the content, all or portions of text of the document, and/or all or portions of images of the document; and/or other selection of content that is less than the full amount of the document. For example, a randomly selected percentage of the content of the document may be selected as the subset of content. Also, for example, only content that is rendered as text in displaying the document may be selected as the subset of content. Also, for example, all content may be included except content that is identified as an advertisement. Also, for example, content that is determined to be beyond a threshold size, such as a large video, may be excluded and/or less of the content may be utilized. For example, for a large video only a segment of the video may be utilized and/or only metadata of the video may be utilized. The document similarity module 114 may determine, based on the content of two or more documents, one or more measures of similarity and/or dissimilarity to determine if a similarity threshold between the documents is satisfied.

The techniques for determining similarity between documents may vary from implementation to implementation. For example: a Levenshtein edit distance between the contents of two or more documents may be utilized; a Jaro-Winkler edit distance between the between the contents of two or more documents may be utilized; a Jaccard index may be utilized; a Masi distance may be utilized; and/or character counts between the contents of two or more documents may be utilized. In some implementations cosine similarity may be determined between the contents of two or more documents. For example, keywords and/or other content associated with entries in index 125 of two or more documents may be compared to one another to determine similarity between the two or more documents. For example, a cosine similarity between keywords of a first document that are indexed with the document in index 125 and keywords of a second document that are indexed with the second document in index 125 may be determined and utilized to determine the similarity between the documents.

Other techniques for determining similarity may be utilized. For example, in some implementations a comparison of entities associated with two or more documents may be utilized to determine similarity between the documents. For example, if a first document is only associated with entities A, B, C, and D and a second document is only associated with entities A, B, C, D, and E, they may be determined to satisfy a similarity threshold. On the other hand, if a first document is only associated with entities A, B, C, and D and a second document is only associated with entities D and E, they may be determined to not satisfy the similarity threshold. Entities that are associated with a document may be determined, for example, based on a document to entity mapping that maps the document with one or more entities to which the document pertains. In some implementations entities associated with a document may be determined based on frequent and/or prominent mention of one or more alias and/or other properties of the entities in the document.

Figure 6A:
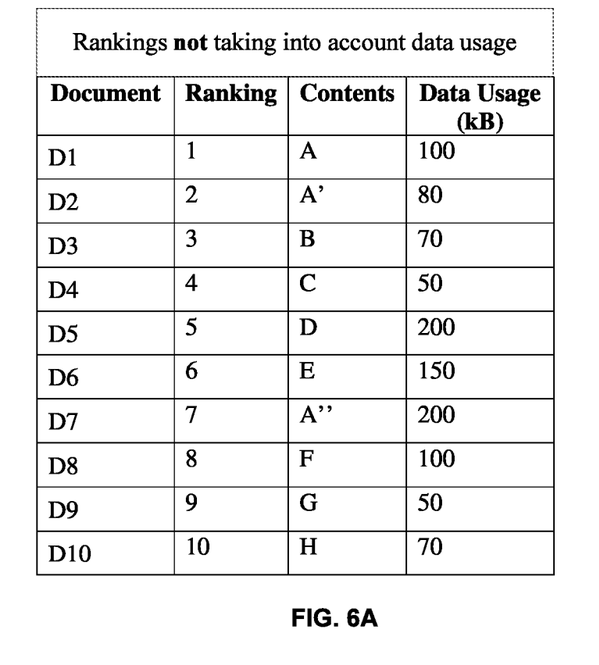
FIG. 6A is an example table utilized in describing an additional example method of ranking search result documents based on data usage required to load the search result documents.
Figure 6B:
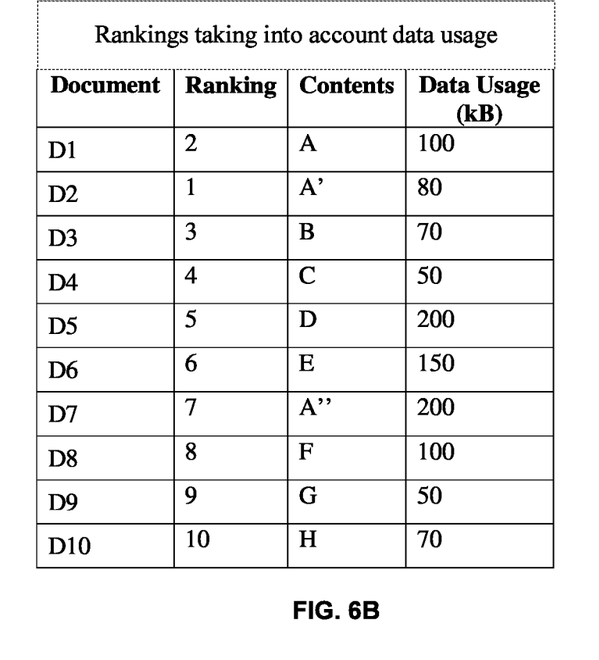
FIG. 6B is another example table utilized in describing the additional example method of ranking search result documents based on data usage required to load the search result documents.

With reference to FIG. 6A and FIG. 6B, an example method of ranking search result documents that are determined to be similar based on utilizing a data measure is described. FIG. 6A illustrates a table listing documents D1-D10 in the first column and rankings associated with each of the documents D1-D10 in the second column. For example, document D1 has a highest ranking of "1"; document D2 has the next highest ranking of "2", and so forth. The rankings in FIG. 6A may be determined based on ranking signals that are independent of data measures of the documents. An indication of the contents of each of the documents D1-D10 is provided in the third column. For example, document D1 has contents A; document D2 has contents A'; document D3 has contents B; and so forth. The contents A of document D1, A' of document D2, and A" of document D7 indicate contents that are similar to one another. For example, D1, D2, and D3 may be webpages each hosting the same Associated Press news story, but each containing other content that is unique such as unique hyperlinks, menus, banners, ads, etc. In some implementations the document similarity module 114 may determine documents D1, D2, and D7 contain similar contents utilizing one or more techniques such as those discussed herein. The data usage in kB is illustrated in the fourth column. For example, document D1 has an associated data usage of 100 kB, document D2 has an associated data usage of 80 kB, and so forth. In the example method, the data usage of the fourth column is utilized as the data measure. As discussed herein, in some implementations one or more of the data usages of the fourth column may be a measured value based on actual data usage during retrieval of the document.

FIG. 6B illustrates a table that lists the same documents D1-D10 in the first column as FIG. 6A, lists the same contents in the third column as FIG. 6A, and lists the same data usages in the fourth column as FIG. 6A. However, the rankings associated with the documents D1-D10 in the second column of FIG. 6B have been modified relative to those of FIG. 6A based on utilizing a data measure to modify the ranking of two of the search result documents, D1 and D2, that are determined to be similar. In the example of FIG. 6B, the ranking of document D1 has been promoted and the ranking of D2 has been demoted based on comparison of the data measures of D1 and D2. Document D1 has a data measure of 100 kB, while document D2 has a data measure of only 80 kB. Since document D2 has a data measure indicative of less data usage required to load the document than D1, it may be promoted to a more prominent ranking than document D1. The more prominent ranking of document D2 may result in an increased likelihood that users will select document D2, thus resulting in less data usage by the user in retrieving document D2 as compared to retrieving document D1. Document D7 also contains content that is determined to be similar to the content of documents D1 and D2. However, the data measure of document D7 (200 kB) is indicative of more data usage to load the document than the data measure of document D1 (100 kB) and of document D2 (80 kB). Accordingly, in the example of FIG. 6B, the ranking of document D7 has not been adjusted. In the example of FIG. 6B, the ranking of the other documents D3-D6 and D8-D10 have not been adjusted since those documents do not include content that is similar to the content of any other documents.

Although a particular technique is described with respect to FIGS. 6A and 6B, additional and/or alternative techniques may be utilized to rank search result documents that are determined to be similar based on utilizing a data measure. For example, various techniques may be utilized for promoting and/or demoting one or more documents that are determined to have similar contents relative to one another. For example, assume an example where: two documents D1 and D2 have similar contents; document D2 has a data measure less indicative of data usage than the data measure of document D1; and document D1 has an initial ranking of "2" and document D2 has an initial ranking of "5". In some implementations the rankings of D1 and D2 may be switched (D1=5, D2=2) based on comparing the data measures. In some other implementations the ranking of D1 may be demoted X positions and the ranking of D2 may be promoted X positions based on comparison of the data measures. For example, the ranking of D1 may be demoted 6 positions to a ranking of "7" and the ranking of D2 may be promoted 2 positions to a ranking of "3". In some implementations the degree of promotion and/or demotion may be based on the difference between the data measures of documents D1 and D2 and/or the difference between raking scores of documents D1 and D2 that are independent of data measures.

As another example, assume: two documents D1 and D2 have similar contents and document D1 has an initial ranking that is more prominent than the ranking of document D2. In some implementations the ranking of documents D1 and D2 may be switched if the following conditions are met: document D2 has a data measure less indicative of data usage than the data measure of document D1 and the difference in the initial ranking between document D1 and document D2 is less than a threshold. For example, in some implementations the rankings of documents D1 and D2 may be switched if the difference in an initial ranking between the documents is less than or equal to 10 positions, but not if the difference in the initial ranking between the documents is greater than 10 positions. Also, for example, in some implementations the rankings of documents D1 and D2 may be switched if the difference in an initial ranking score between the documents is less than or equal to 0.1, but not if the difference initial ranking between the documents is greater than 0.1.

Also, although adjusting an existing ranking of documents that are determined to be similar based on utilizing a data measure is illustrated in FIGS. 6A and 6B, in some implementations the data measure may be utilized as a ranking signal in determining an initial ranking of two or more documents determined to be similar. For example, in some implementations a score that is independent of the data measure may be determined for all documents, and for those documents that have similar content to one or more other documents, a data measure may be utilized to modify the score. For example, the data measures may be a value between 0.8 and 1.2, with lower values corresponding to more data usage than higher values—thereby applying a boost to certain scores of such documents while demoting certain other scores of such documents. Also, for example, in some implementations a score that is independent of the data measure may not be initially determined, but, instead, an initially determined score may take the data measure into account for those documents that have similar content to one or more other documents. Also, for example, in some implementations, a data measure may be utilized as a ranking signal in determining an initial ranking of two or more documents determined to be similar and documents not determined to be similar, but the weighting of the data measure may be greater for those documents determined to be similar.

Many other configurations are possible having more or fewer components than the environment shown in FIG. 1. For example, in some environments the query analysis module 112 and/or the document similarity module 114 may be omitted.

Figure 2:
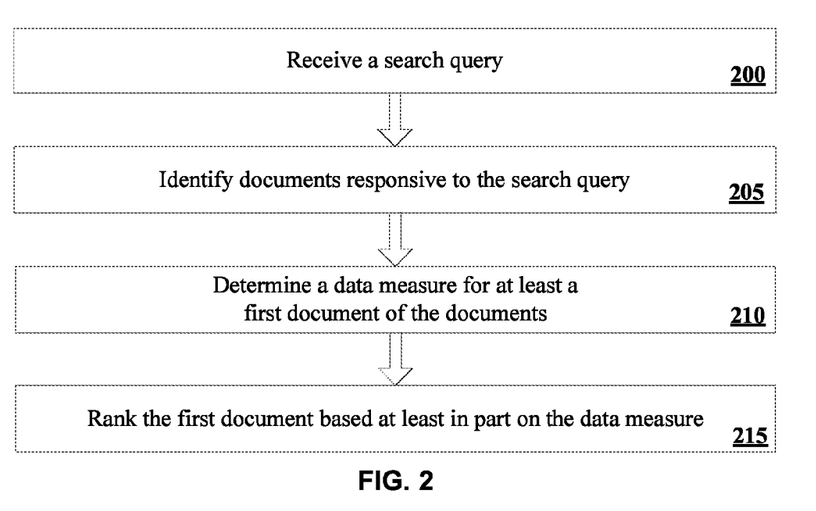
FIG. 2 is a flow chart illustrating an example method of ranking a search result document based on data usage required to load the search result document.

FIG. 2 is a flow chart illustrating an example method of ranking a search result document based on data usage required to load the search result document. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the ranking engine 110 of FIG. 1.

At step 200, a search query is received. In some implementations the search system 102 may receive the search query from a computing device such as client device 106. In some implementations, it may be determined if the received search query is a navigational query and/or is a non-navigational query. In some implementations it may be determined if the search query is likely issued via a limited data plan. In some implementations, the query analysis module 112 may determine whether the search query is navigational, non-navigational, and/or issued via a limited data plan.

At step 205, documents are identified based on the search query received at step 200. For example, in some implementations the ranking engine 110 may use the index 125 to identify documents responsive to the query.

At step 210, a data measure is determined for at least a first document of the documents identified at step 205. For example, in some implementations the ranking engine 110 may use the index 125 and/or other database to determine a data measure for the first document. The data measure of the first document is indicative of the amount of data usage required to load the document. In some implementations the data measure may be a measured value based on actual data usage during retrieval of the first document. In some implementations data measures may also be determined for additional documents such as all documents identified at step 205, the top X documents identified at step 205 based on other ranking signals, those documents identified at step 205 having similar content as the first document, and so forth. In some implementations, step 210 may only occur if the search query is determined to be non-navigational and/or issued via a limited data plan.

At step 215, the first document is ranked based at least in part on the data measure determined at step 210. Generally speaking, the ranking of the document may be more positively influenced by a first data measure that is indicative of a first amount of data usage than it would be by a second data measure that is indicative of a second amount of data usage that is greater than the first amount of data usage. In some implementations, the data measure may be utilized as one of multiple ranking signals to determine a relevance score for the first document. For example, the data measure may be utilized to determine an initial score for the document and/or to modify an initial score for the document. Also, for example, the data measure may be utilized to promote and/or demote, based on the data measure, an initially determined ranking of the first document.

In some implementations rankings for additional documents that are based on their respective data measures may also be determined such as all documents identified at step 205, the top X documents identified at step 205 based on other ranking signals, those documents identified at step 205 having similar content as the first document, and so forth. In some implementations, step 215 may only occur if the search query is determined to be non-navigational and/or issued via a limited data plan. In some implementations, the weighting of the data measure in determining a ranking for the first document in step 215 may be dependent on whether and/or the likelihood that the search query is determined to be non-navigational and/or issued via a limited data plan.

In some implementations the ranking engine 110 may transmit the determined ranking based on the data measure for the first document and/or other documents for storage in a database such as content database 115. In some implementations stored data may optionally be associated with a corresponding query in the database for future retrieval in response to a future search request for the query. In some implementations the ranking engine 110 may transmit the determined ranking based on the data measure for a real time query. For example, the search system 102 may use the responsive documents ranked by the ranking engine 110 to generate search results 108 that are transmitted to the client device 106 in a form that may be provided to the user. The search results 108 may be provided to the user based on the ranking of the corresponding search result documents.

Figure 3:
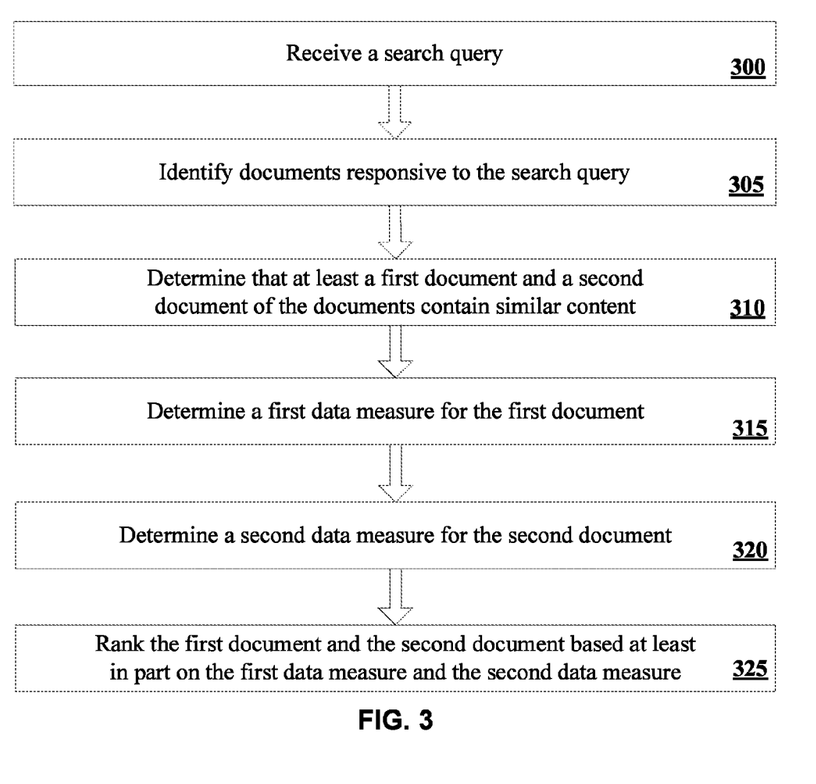
FIG. 3 is a flow chart illustrating an example method of ranking a first search result document and a second search result document based on data usage required to load the first search result document and data usage required to load the second search result document.

FIG. 3 is a flow chart illustrating an example method of ranking a first search result document and a second search result document based on data usage required to load the first search result document and data usage required to load the second search result document. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the ranking engine 110 of FIG. 1.

At step 300, a search query is received. In some implementations the search system 102 may receive the search query from a computing device such as client device 106. Step 300 may share one or more aspects in common with step 200 of FIG. 2.

At step 305, documents are identified based on the search query received at step 200. For example, in some implementations the ranking engine 110 may use the index 125 to identify documents responsive to the query. Step 305 may share one or more aspects in common with step 205 of FIG. 2

At step 310, it is determined that at least a first document and a second document of the documents identified at step 305 contain similar content. For example, in some implementations the document similarity module 114 may determine if two or more search result documents contain similar content. Various techniques may be utilized to determine if two or more documents contain similar content such as one or more techniques discussed herein. For example, techniques may include comparison of entities associated with the documents, comparison of contents of the documents, and so forth.

At step 315, a data measure is determined for the first document identified at step 210. For example, in some implementations the ranking engine 110 may use the index 125 and/or other database to determine a data measure for the first document. Step 320 may include one or more aspects in common with step 210 of FIG. 2 and/or step 315 of FIG. 3.

At step 320, a data measure is determined for the second document identified at step 210. For example, in some implementations the ranking engine 110 may use the index 125 and/or other database to determine a data measure for the first document. Step 315 may include one or more aspects in common with step 210 of FIG. 2.

At step 325, the first document and the second document are ranked based at least in part on the first data measure and the second data measure. For example, the ranking engine 110 may rank the first document and the second document. In some implementations the data measures may be utilized to promote and/or demote previously determined rankings of the first document and the second document. In some implementations the first document and the second document may be ranked based on comparison of the first data measure and the second data measure. For example, in some implementations, the document associated with whichever data measure is indicative of less data usage may be assigned a more prominent ranking. In some implementations the ranking of the first document may be based on the first data measure and be independent of the second data measure. Similarly, in some implementations the ranking of the second document may be based on the second data measure and be independent of the first data measure. In some implementations, the data measures may be utilized as one of multiple ranking signals to determine a relevance score for the first document and the second document. Additional and/or alternative techniques may be utilized such as, for example, those described with respect to FIGS. 6A and 6B.

In some implementations rankings for additional documents that are based on their respective data measures may also be determined such as all documents identified at step 305, the top X documents identified at step 305 based on other ranking signals, additional documents identified at step 305 having similar content as one or more other documents, and so forth. In some implementations, step 315 may only occur if the search query is determined to be non-navigational and/or issued via a limited data plan. In some implementations, the weighting of the data measure in determining a ranking for the first document and the second document in step 320 may be dependent on whether and/or the likelihood that the search query is determined to be non-navigational and/or issued via a limited data plan. Step 320 may include one or more aspects in common with step 215 of FIG. 2.

Figure 4:
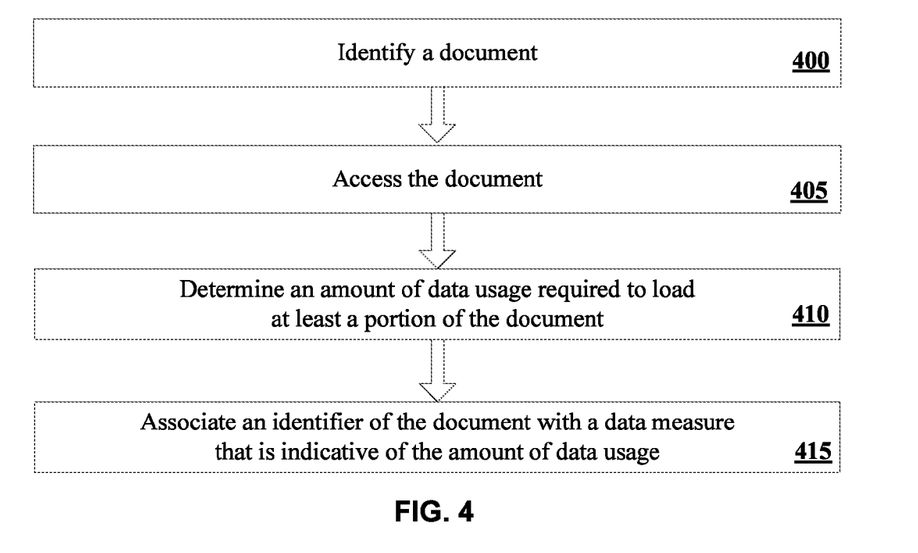
FIG. 4 is a flow chart illustrating an example method of associating a data measure with a document.

FIG. 4 is a flow chart illustrating an example method of associating a data measure with a document. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the document data usage module 122 of FIG. 1.

At step 400, a document is identified. For example, the indexing engine 120 and/or the document data usage module 122 may identify the document. For example, a document may be identified from a listing of documents and/or via following a hyperlink to the document during crawling of a plurality of documents and indexing of those documents. Also, for example, the document may be identified from an index of previously crawled and indexed documents.

At step 405, the document is accessed. For example, the document data usage module 122 may access the document. In some implementations accessing the document may include retrieving one or more aspects of content of the document such as meta information of the document and/or additional content of the document. For example, accessing a webpage may include retrieving HTML code and one or more aspects of content that is mapped in the HTML code such as images, sounds, additional code, etc.

At step 410, an amount of data usage required to load at least a portion of the document is determined. For example, the document data usage module 122 may determine the amount of data usage. In some implementations the document data usage module 122 may determine the amount of data usage of the document based on meta information of the document.

In some implementations, the document data usage module 122 may determine the amount of data usage of a document by measuring actual data usage during retrieval of the document. For example, the document may be a webpage that includes HTML code, and the amount of data usage may be based on actual data usage in retrieving such HTML code and in retrieving one or more aspects of content that is mapped in such HTML code that would be retrieved by a browser or other application in retrieving the webpage and rendering the webpage for display to a user. Content that may be mapped in the HTML code may include, for example, images, sounds, additional code (e.g., ECMAScript implementations such as JavaScript), and/or other content. In some implementations the content of a document that is retrieved and/or utilized by the data usage module 122 to determine an amount of data usage may include all content necessary to initially fully render the document. For example, for a webpage, the content may include the entirety of the source code of the webpage such as HTML and/or XML source code and any images, video, music, and/or other media rendered upon initial retrieval the webpage. In some implementations, the content of a document that is retrieved and/or utilized by the data usage module 122 to determine an amount of data usage may include content necessary to recreate only a portion of the document. In some implementations, the data usage module 122 may determine the amount of data usage of a document based only on a most recently accessed version of the document. In other implementations, the amount of data usage of a document may be based on multiple versions of the document.

At step 415, an identifier of the document identified at step 400 is associated with a data measure that is indicative of the amount of data usage determined at step 410. For example, the document data usage module 122 may store a data measure in an entry in index 125 and/or other database that is associated with the document identified at step 400. In some implementations the data measure may be the data usage. For example, for a webpage that has a data usage of 600 kB, the data measure may be 600 kB. In other implementations other data measures may be utilized that provide an indication of the amount of data usage. For example, as discussed herein, in some implementations a data measure may be a value between 0 and 1, with higher values corresponding to more data usage. Additional and/or alternative data measures may be utilized such as those discussed herein.

Figure 7:
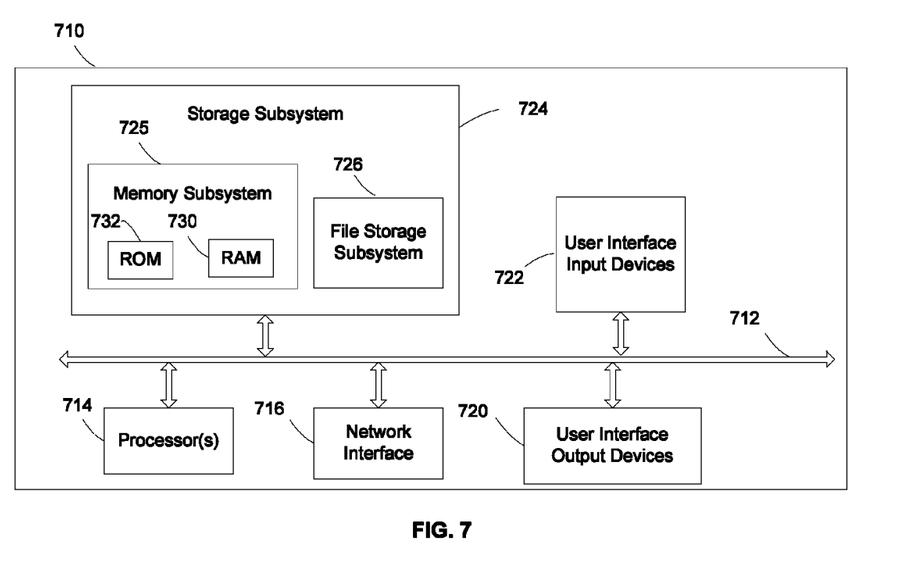
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to rank one or more documents based on data measures of the documents.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 724 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 724 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A computer implemented method, comprising:
    receiving a search query;
    identifying a plurality of documents that are responsive to the search query, the plurality of documents including a first document and a second document;
    determining a first data measure for the first document, wherein the first data measure is indicative of an amount of data usage required to load the first document;
    determining a second data measure for the second document, wherein the second data measure is indicative of an amount of data usage required to load the second document;
    determining that the first document is similar to the second document;
    in response to determining that the first document is similar to the second document, ranking the first document relative to the second document based on the first data measure and the second data measure; and
    providing search results for display in response to the search query, wherein providing the search results comprises providing a first search result that is based on the first document, providing a second search result that is based on the second document, and providing the first search result and the second search result based on the ranking.

2. The method of claim 1, wherein ranking the first document relative to the second document based on the first data measure and the second data measure comprises:
    determining the first data measure is indicative of less data usage than the second data measure; and
    ranking the first document more prominently than the second document based on the first data measure being indicative of less data usage than the second data measure.

3. The method of claim 1, wherein ranking the first document relative to the second document based on the first data measure and the second data measure comprises:
    determining a first document initial ranking of the first document, the first document initial ranking being independent of the first data measure;
    ranking the first document based on the first document initial ranking and the first data measure;
    determining a second document initial ranking of the second document, the second document initial ranking being independent of the second data measure; and
    ranking the second document based on the first document initial ranking and the second data measure.

4. The method of claim 1, further comprising determining that the search query is non-navigational, wherein ranking the first document relative to the second document is based on determining the search query is non-navigational.

5. The method of claim 4, wherein ranking the first document relative to the second document based on determining the search query is non-navigational comprises ranking the first document relative to the second document in response to determining the search query is non-navigational.

6. The method of claim 4, wherein ranking the first document relative to the second document based at least in part on determining the search query is non-navigational comprises determining weightings of the first data measure and the second data measure based on the search query being determined to be non-navigational, the weightings used in ranking the first document relative to the second document.

7. The method of claim 4, further comprising:
    receiving a second search query;
    determining that the second search query is navigational; and
    in response to determining that the second search query is navigational, preventing determination of rankings of documents responsive to the second search query that are based on data measures of the documents.

8. The computer-implemented method of claim 1, further comprising:
    retrieving at least a portion of the first document prior to ranking the first document relative to the second document;
    generating the first data measure based on a first amount of data usage during the retrieving of the portion of the first document;

retrieving at least a portion of the second document; and
generating the second data measure based on a second amount of data usage during the retrieving of the portion of the second document.

9. A computer implemented method, comprising:
receiving a search query;
identifying a plurality of documents that are responsive to the search query, the plurality of documents including a first document;
determining a first data measure for the first document, wherein the first data measure is indicative of an amount of data usage required to load the first document;
determining that the search query is non-navigational;
ranking the first document relative to other of the documents based on the first data measure and based on determining that the search query is non-navigational; and
providing search results for display in response to the search query, wherein providing the search results comprises providing a first search result that is based on the first document, providing additional search results that are based on other of the documents, and providing the first search result and the additional search results based on the ranking.

10. The method of claim 9, wherein ranking the first document based on determining the search query is non-navigational comprises ranking the first document based on the first data measure in response to determining the search query is non-navigational.

11. The method of claim 9, wherein ranking the first document based on determining the search query is non-navigational comprises determining a weighting of the first data measure based on the search query being determined to be non-navigational, the weighting used in ranking the first document relative to the other of the documents.

12. The method of claim 9, further comprising:
receiving a second search query;
determining that the second search query is navigational; and
in response to determining that the second search query is navigational, preventing determination of rankings of documents responsive to the second search query that are based on data measures of the documents.

13. The computer-implemented method of claim 9, further comprising:
retrieving at least a portion of the first document prior to ranking the first document relative to other of the documents;
generating the first data measure based on a first amount of data usage during the retrieving of the portion of the first document.

14. The computer-implemented method of claim 13, wherein retrieving the portion of the first document and generating the first data measure occur prior to receiving the search query.

15. A computer implemented method, comprising:
retrieving at least a portion of a first document;
generating a first data measure for the first document based on an amount of data usage during the retrieving of the portion of the first document;
associating the first data measure with the first document;
receiving a search query after generating the first data measure for the first document;
identifying a plurality of documents that are responsive to the search query, wherein the plurality of documents include the first document;
identifying the first data measure associated with the first document; and
ranking the first document relative to other of the documents based at least in part on the first data measure.

16. The method of claim 15, further comprising:
determining that a second document of the documents is similar to the first document;
determining a second data measure for the second document, the second data measure of the second document indicative of an amount of data usage required to load the second document; and
ranking the second document relative to other of the documents based at least in part on the second data measure.

17. The method of claim 16, wherein ranking the first document relative to the other of the documents includes:
ranking the first document relative to the second document based on comparison of the first data measure to the second data measure.

18. The method of claim 17, wherein ranking the first document relative to the second document based on comparison of the first data measure to the second data measure includes:
determining the first data measure is indicative of less data usage than the second data measure; and
ranking the first document more prominently than the second document when the first data measure is indicative of less data usage than the second data measure.

* * * * *